US007910179B2

(12) United States Patent  
Cheong et al.

(10) Patent No.: US 7,910,179 B2  
(45) Date of Patent: Mar. 22, 2011

(54) VINYLSULFONE DERIVATIVE, LIQUID CRYSTAL COMPOSITION COMPRISING THE SAME AND COMPENSATION FILM USING THE SAME LIQUID CRYSTAL COMPOSITION

(75) Inventors: Jae Ho Cheong, Daejeon (KR); Min Jin Ko, Daejeon (KR); Dae Ho Kang, Daejeon (KR); Ki Youl Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 435 days.

(21) Appl. No.: 11/602,334

(22) Filed: Nov. 21, 2006

(65) Prior Publication Data

US 2007/0114493 A1    May 24, 2007

(30) Foreign Application Priority Data

Nov. 23, 2005  (KR) .................. 10-2005-0112316

(51) Int. Cl.
- *C07C 317/00* (2006.01)
- *C07C 317/08* (2006.01)
- *C07C 317/10* (2006.01)
- *C07C 317/24* (2006.01)
- *C09K 19/52* (2006.01)
- *C09K 19/54* (2006.01)
- *C09K 19/20* (2006.01)

(52) U.S. Cl. ............... 428/1.1; 560/11; 560/18; 560/87; 252/299.01; 252/299.5; 252/299.67

(58) Field of Classification Search .......... 564/80, 564/99; 252/299.66, 299.67; 560/11, 18, 560/87

See application file for complete search history.

(56) References Cited

U.S. PATENT DOCUMENTS

| 5,855,813 | A | 1/1999 | Coles et al. |
| 6,174,922 | B1* | 1/2001 | Arnold et al. .......... 514/604 |
| 6,303,816 | B1* | 10/2001 | Arnold et al. .......... 564/82 |
| 6,468,608 | B1 | 10/2002 | Bremer et al. |
| 6,525,099 | B1* | 2/2003 | Arnold et al. .......... 514/605 |
| 6,596,716 | B2* | 7/2003 | McKennon et al. ....... 514/222.2 |
| 2003/0168632 | A1 | 9/2003 | Kato et al. |

FOREIGN PATENT DOCUMENTS

| JP | 10-114894 | 5/1998 |
| JP | 11-29580 | 2/1999 |
| JP | 2002-255974 | 9/2002 |
| JP | 2002-265475 A | 9/2002 |
| KR | 10-2001-0071865 | 7/2001 |
| KR | 10-2002-0005004 | 1/2002 |
| WO | WO 00/06537 | 2/2000 |
| WO | WO 2005/054406 A1 | 6/2005 |

OTHER PUBLICATIONS

CAPLUS 1998: 542964.*

* cited by examiner

*Primary Examiner* — Shean C Wu  
(74) *Attorney, Agent, or Firm* — McKenna Long & Aldridge LLP

(57) ABSTRACT

Disclosed are a vinylsulfone derivative, a liquid crystal composition comprising the same, and a compensation film for a liquid crystal display device using the same liquid crystal composition. More particularly, the vinylsulfone derivative is a liquid crystal material of a high-quality view angle compensation film, which improves a contrast ratio measured at a tilt angle when compared to a contrast ratio measured from the front surface and minimizes color variations in a black state depending on view angles.

11 Claims, 1 Drawing Sheet

VINYLSULFONE DERIVATIVE, LIQUID CRYSTAL COMPOSITION COMPRISING THE SAME AND COMPENSATION FILM USING THE SAME LIQUID CRYSTAL COMPOSITION

This application claims the benefit of the filing date of Korean Patent Application No. 10-2005-0112316, filed on Nov. 23, 2005, in the Korean Intellectual Property Office, the disclosure of which is incorporated herein in its entirety by reference.

BACKGROUND OF THE INVENTION (a) Field of the Invention

The present invention relates to a vinylsulfone derivative, a liquid crystal composition comprising the same, and a compensation film for a liquid crystal display device using the same liquid crystal composition. More particularly, the present invention relates to a liquid crystal material of a high-quality view angle compensation film, which improves a contrast ratio measured at a tilt angle when compared to a contrast ratio measured from the front surface and minimizes color variations in a black state depending on view angles. The present invention also relates to a liquid crystal composition comprising the same liquid crystal material and a compensation film obtained from the same liquid crystal composition.

(b) Description of the Related Art

Recently, as watches, notebook PCs, cellular phones, televisions and monitors have extended the market, display devices having low weight and requiring low power consumption have been increasingly in demand. Since liquid crystal display devices (LCDs) are light and thin and require low power consumption, they have been widely applied to such products.

However, a liquid crystal display device has a disadvantage of view angle dependency. In other words, an LCD shows variations in color or light/darkness depending on view directions or angles. Additionally, as the screen of an LCD increases in size, view angle decreases more and more. As compared to a conventional CRT (cathode ray tube) device having a view angle of about 180°, a TFT-LCD with no view angle compensation shows a view angle of merely about ±50°.

To solve the above problem, various methods have been used, such methods including a multi-domain method in which pixels are divided in liquid crystal cells to control the liquid crystal alignment, a method of controlling a voltage and a method of utilizing an optical compensation film.

The above-mentioned view angle dependency of a liquid crystal display devices is caused by the incident light having a tilt angle to the LCD panel, which shows a birefringence effect different from that of the vertical incident light. To compensate for this, an optical compensation film has been widely used. Herein, retardation films having an opposite birefringence index to the panel are attached onto both surfaces of the panel. Also, as display panels have increased in size, there has been a need for a high-quality liquid crystal compensation film.

A retardation film is obtained by coating an aligned transparent support with liquid crystal, and aligning the liquid crystal along a predetermined direction to the direction of an aligning layer, followed by curing. After aligning, the liquid crystal has a direction opposite to the direction of liquid crystal cells upon application of a voltage, so that light leakage in a black state can be minimized. When combining such retardation films with a liquid crystal panel and light is allowed to penetrate through the panel, it is possible to compensate for a retardation of light caused by a difference of light paths, because the incident light has a similar path in all directions. Additionally, it is also possible to perform compensation of a difference in birefringence indexes in all directions by optimizing a birefringence latitude of each film, an angle formed between films, a rubbing direction and an angle to a polarizer.

A liquid crystal compound used to manufacture such films should be stable against moisture, light, heat, air, electric fields, or the like. Also, the liquid crystal compound should be chemically stable under an environment of use. Further, in order to apply a liquid crystal compound to a display device, the compound should have adequately balanced physical properties, including a broad range of liquid crystal phase temperatures and refraction anisotropy ($\Delta n$). Under these circumstances, there is a need for a novel liquid crystal compound satisfying various physical properties required for various types of display devices.

SUMMARY OF THE INVENTION

Therefore, the present invention has been made in view of the above-mentioned problems. It is an object of the present invention to provide a novel vinylsulfone derivative useful as a material for a view angle compensation film that can improve a contrast ratio and minimize variations in color depending on view angles in a black state.

It is another object of the present invention to provide a liquid crystal composition comprising the above vinylsulfone derivative, and a compensation film for liquid crystal display device using the above liquid crystal composition.

According to an aspect of the present invention, there is provided a novel vinylsulfone derivative. Also, the present invention provides a liquid crystal composition comprising the above vinylsulfone derivative, and a compensation film for liquid crystal display device using the same.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE INVENTION

Figure 1:
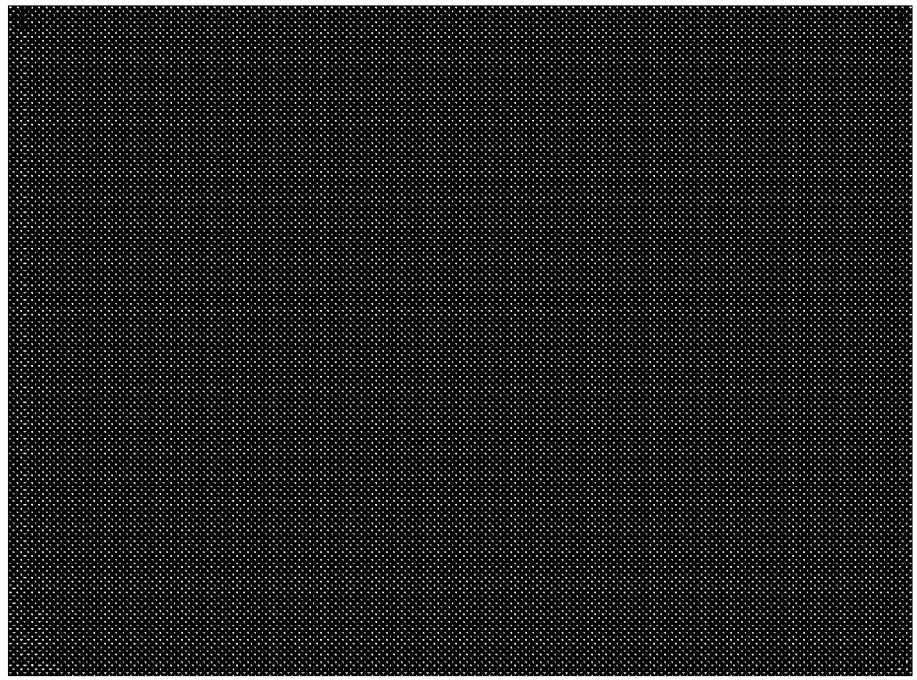
FIG. 1 is a photographic view taken by a polarizing microscope, which shows a liquid crystal display using a compensation film according to a preferred embodiment of the present invention in a black state.
Figure 2:
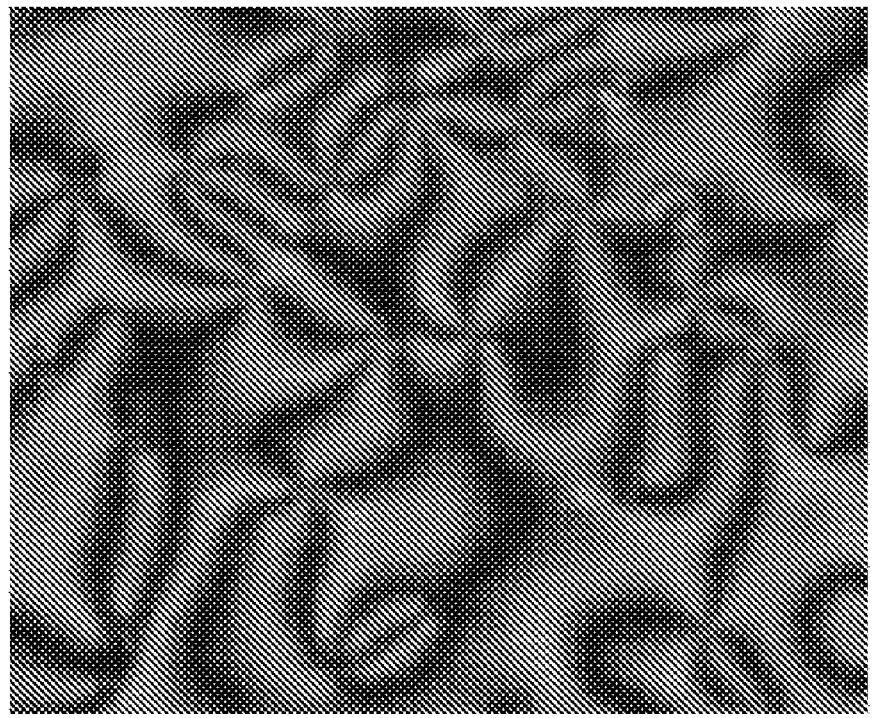
FIG. 2 is a photographic view taken by a polarizing microscope, which shows a nematic liquid crystal phase of the liquid crystal composition according to a preferred embodiment of the present invention.

Hereinafter, the present invention will be explained in more detail.

The novel vinylsulfone derivative according to the present invention is represented by the following Formula 1:

[Formula 1]

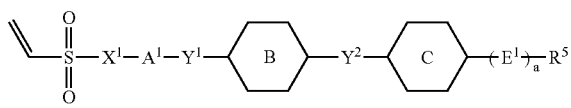

wherein $X^1$ is —O—, —NH—, —CH$_2$CH$_2$O—, —CH$_2$CH$_2$NH— or —(CH$_2$)$_m$—, and m is 1 or 2;

$A^1$ is a C$_1$~C$_{12}$ alkylene, a C$_2$~C$_{12}$ alkenylene, —(CH$_2$CH$_2$O)$_n$—, —(CH$_2$CHCH$_3$O)$_n$— or —(CHCH$_3$CH$_2$O)$_n$—, and n is an integer of 1~5;

each of $Y^1$ and $Y^2$ independently represents —O—, —NH—, —(CH$_2$)$_p$—, —CH=CH—, —C≡C—, —C(=O)O—, —OC(=O)— or —C(=O)—, and p is an integer of 0~2;

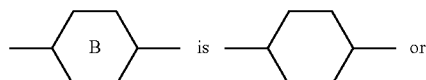

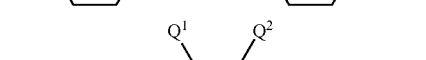

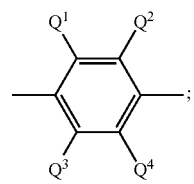

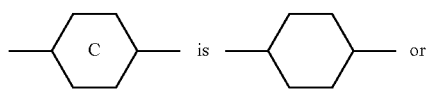

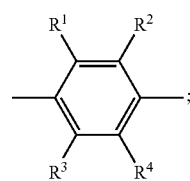

$E^1$ is

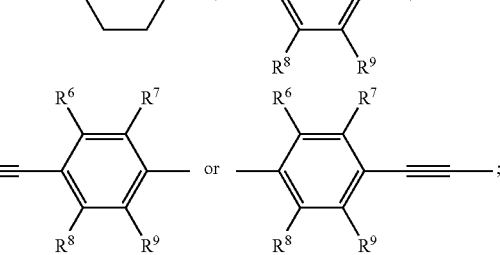

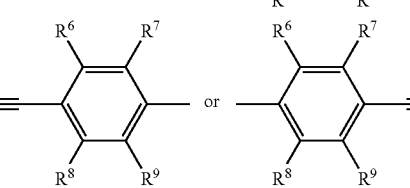

a is an integer of 0~2;

each of $Q^1$~$Q^4$, $R^1$~$R^4$ and $R^6$~$R^9$ independently represents —H, —F, —Cl, —Br, —I, —CN, —OH, —CH$_3$, —CH$_2$CH$_3$ or —C(=O)CH$_3$; and $R^5$ is —H, —F, —Cl, —Br, —I, —CF$_3$, —CN, —OH, —OCH$_3$, —OCH$_2$CH$_3$, —OCF$_3$, a C$_1$~C$_{12}$ alkyl or a C$_2$~C$_{12}$ alkenyl.

In addition, the novel compound according to the present invention is a vinylsulfone derivative represented by the following Formula 2:

[Formula 2]

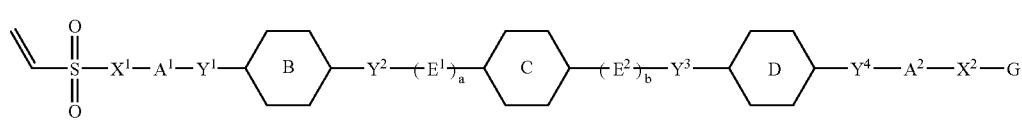

wherein G is

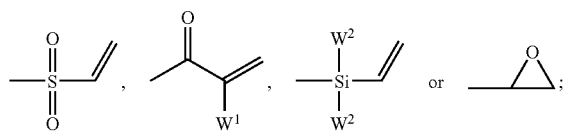

each of $W^1$ and $W^2$ independently represents —H, —CH$_3$, —CH$_2$CH$_3$, —F, —Cl, —Br or —CF$_3$;

each of $X^1$ and $X^2$ independently represents —O—, —NH—, —CH$_2$CH$_2$O—, —CH$_2$CH$_2$NH— or —(CH$_2$)$_m$—, and m is 1 or 2;

each of $A^1$ and $A^2$ independently represents a C$_1$~C$_{12}$ alkylene, a C$_2$~C$_{12}$ alkenylene, —(CH$_2$CH$_2$O)$_n$—, —(CH$_2$CHCH$_3$O)$_n$— or —(CHCH$_3$CH$_2$O)$_n$—, and n is an integer of 1~5;

each of $Y^1$~$Y^4$ independently represents —O—, —NH—, —(CH$_2$)$_p$—, —CH=CH—, —C≡C—, —C(=O)O—, —OC(=O)— or —C(=O)—, and p is an integer of 0~2;

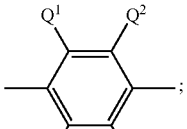

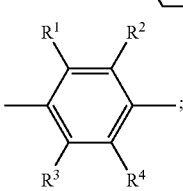

-continued

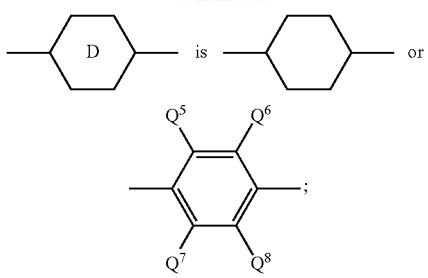

each of $E^1$ and $E^2$ independently represents

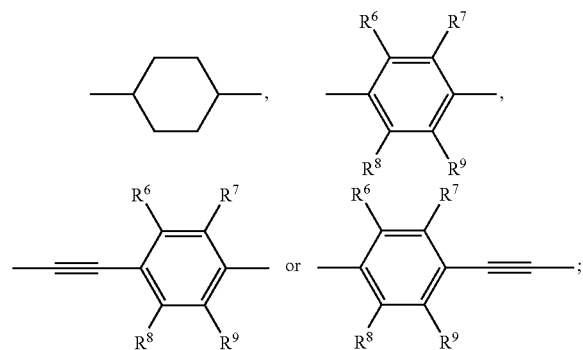

each of a and b independently represents an integer of 0~2; and each of $Q^1$~$Q^8$, $R^1$~$R^4$ and $R^6$~$R^9$ independently represents —H, —F, —Cl, —Br, —I, —CN, —OH, —CH$_3$, —CH$_2$CH$_3$ or —C(═O)CH$_3$.

The vinylsulfone derivatives represented by Formula 1 and Formula 2 are liquid crystal compounds applicable to a compensation film for liquid crystal display device, which improves view angles of various display devices.

In the vinylsulfone derivative represented by Formula 1, non-limiting examples of the $C_2$~$C_{12}$ alkenylene as $A^1$ include —CH═CH—, —CH═CCH$_3$—, —CH$_2$CH═CH—, —CH═CHCH$_2$CH$_2$—, —CH$_2$CH═CHCH$_2$—, —CH$_2$CH$_2$CH═CH—, —CH═CHCH$_2$CH$_2$CH$_2$—, —CH$_2$CH═CHCH$_2$CH$_2$—, —CH$_2$CH$_2$CH═CHCH$_2$—, —CH$_2$CH$_2$CH$_2$CH═CH—, or the like. Additionally, non-limiting examples of the $C_2$~$C_{12}$ alkenyl as $R^5$ include —CH═CH$_2$, —CH═CHCH$_3$, —CH$_2$CH═CH$_2$, —CH═CHCH$_2$CH$_3$, —CH$_2$CH═CHCH$_3$, —CH$_2$CH$_2$CH═CH$_2$, —CH═CHCH$_2$CH$_2$CH$_3$, —CH$_2$CH═CHCH$_2$CH$_3$, —CH$_2$CH$_2$CH═CHCH$_3$, —CH$_2$CH$_2$CH$_2$CH═CH$_2$, or the like.

In the vinylsulfone derivative represented by Formula 2, the $C_2$~$C_{12}$ alkenylene groups as $A^1$ and $A^2$ are independent from each other, and non-limiting examples of the $C_2$~$C_{12}$ alkenylene include —CH═CH—, —CH═CCH$_3$—, —CH$_2$CH═CH—, —CH═CHCH$_2$CH$_2$—, —CH$_2$CH═CHCH$_2$—, —CH$_2$CH$_2$CH═CH—, —CH═CHCH$_2$CH$_2$CH$_2$—, —CH$_2$CH═CHCH$_2$CH$_2$—, —CH$_2$CH$_2$CH═CHCH$_2$—, —CH$_2$CH$_2$CH$_2$CH═CH—, or the like.

In one preferred embodiment of the vinylsulfone derivative represented by Formula 1, $Y^1$ may be —O—, $Y^2$ may be —C(═O)O—, ring B and ring C may be aromatic rings, and $Q^1$~$Q^4$ may be H. Such a vinylsulfone derivative may be represented by the following Formula 3:

[Formula 3]

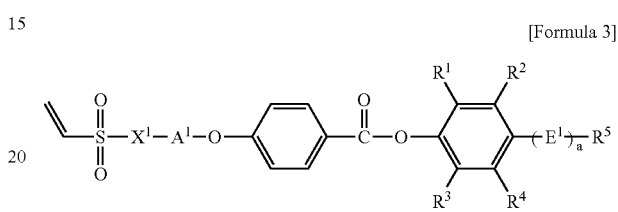

wherein $X^1$, $A^1$, $E^1$, a and $R^1$~$R^5$ are the same as defined in the above Formula 1.

In one preferred embodiment of the vinylsulfone derivative represented by Formula 2, each of $Y^1$ and $Y^4$ may be —O—, $Y^2$ may be —C(═O)O—, $Y^3$ may be —OC(═O)—, ring B, ring C and ring D may be aromatic rings, each of $Q^1$~$Q^8$ may be H, and each of a and b may be 0. Such a vinylsulfone derivative may be represented by the following Formula 4:

[Formula 4]

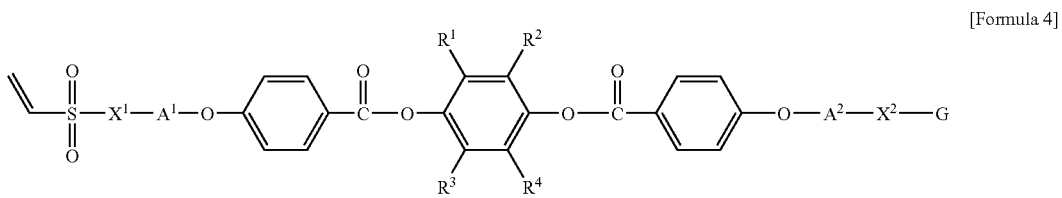

wherein G, $X^1$, $X^2$, $A^1$, $A^2$, $R^1$, $R^2$, $R^3$ and $R^4$ are the same as defined in the above Formula 2.

In another preferred embodiment of the vinylsulfone derivative represented by Formula 1, $A^1$ may be a $C_1$~$C_{12}$ alkylene, $Y^1$ may be —O—, $Y^2$ may be —C(═O)O—, ring B and ring C may be aromatic rings, and each of $Q^1$~$Q^4$ may be H. Such a vinylsulfone derivative may be represented by the following Formula 5:

[Formula 5]

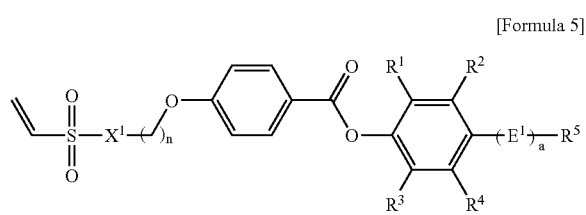

wherein n is an integer of 1~12; and $X^1$, $E^1$, a and $R^1$~$R^5$ are the same as defined in the above Formula 1.

In another preferred embodiment of the vinylsulfone derivative represented by Formula 2, G may be vinylsulfone, each of $A^1$ and $A^2$ may be a $C_1$~$C_{12}$ alkylene, each of $Y^1$ and $Y^4$ may be —O—, $Y^2$ may be —C(═O)O—, $Y^3$ may be —OC(=O)—, ring B, ring C and ring D may be aromatic rings, each of $Q^1$~$Q^8$ may be H, and each of a and b may be 0. Such a vinylsulfone derivative may be represented by the following Formula 6:

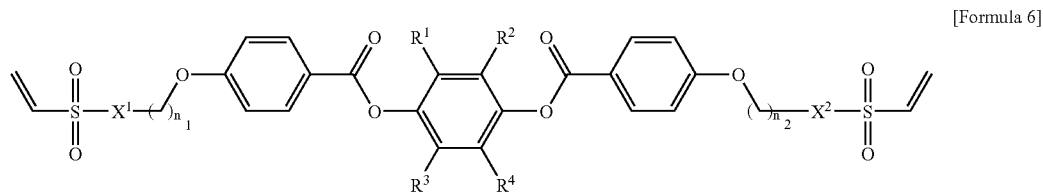

[Formula 6]

wherein each of $n_1$ and $n_2$ independently represents an integer of 1~12; and $X^1$, $X^2$, $R^1$, $R^2$, $R^3$ and $R^4$ are the same as defined in the above Formula 2.

In still another preferred embodiment of the vinylsulfone derivative represented by Formula 2, G may be acryl, each of $A^1$ and $A^2$ may be a $C_1$~$C_{12}$ alkylene, each of $Y^1$ and $Y^4$ may be —O—, $Y^2$ may be —C(=O)O—, $Y^3$ may be —OC(=O)—, ring B, ring C and ring D may be aromatic rings, each of $Q^1$~$Q^8$ may be H, and each of a and b may be 0. Such a vinylsulfone derivative may be represented by the following Formula 7:

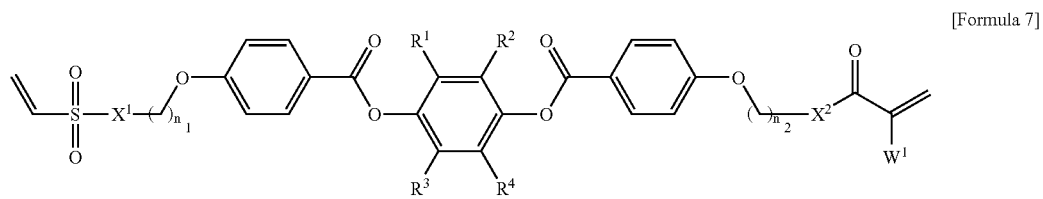

[Formula 7]

wherein each of $n_1$ and $n_2$ independently represents an integer of 1~12; and $W^1$, $X^1$, $X^2$, $R^1$, $R^2$, $R^3$ and $R^4$ are the same as defined in the above Formula 2.

In yet another preferred embodiment of the vinylsulfone derivative represented by Formula 2, G may be vinylsilane, each of $A^1$ and $A^2$ may be a $C_1$~$C_{12}$ alkylene, each of $Y^1$ and $Y^4$ may be —O—, $Y^2$ may be —C(=O)O—, $Y^3$ may be —OC(=O)—, ring B, ring C and ring D may be aromatic rings, each of $Q^1$~$Q^8$ may be H, and each of a and b may be 0. Such a vinylsulfone derivative may be represented by the following Formula 8:

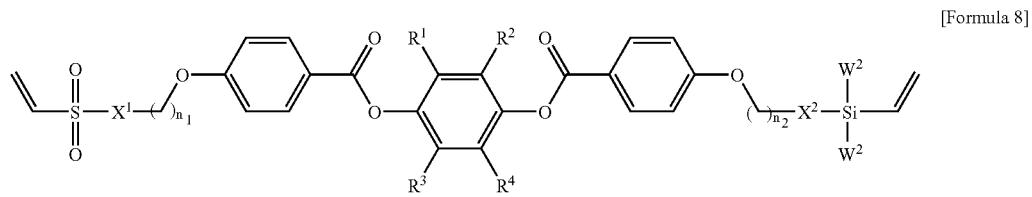

[Formula 8]

wherein each of $n_1$ and $n_2$ independently represents an integer of 1~12; and $W^2$, $X^1$, $X^2$, $R^1$, $R^2$, $R^3$ and $R^4$ are the same as defined in the above Formula 2.

Particular examples of the vinylsulfone derivatives represented by Formula 1 and Formula 2 include the following compounds, but the scope of the present invention is not limited thereto:

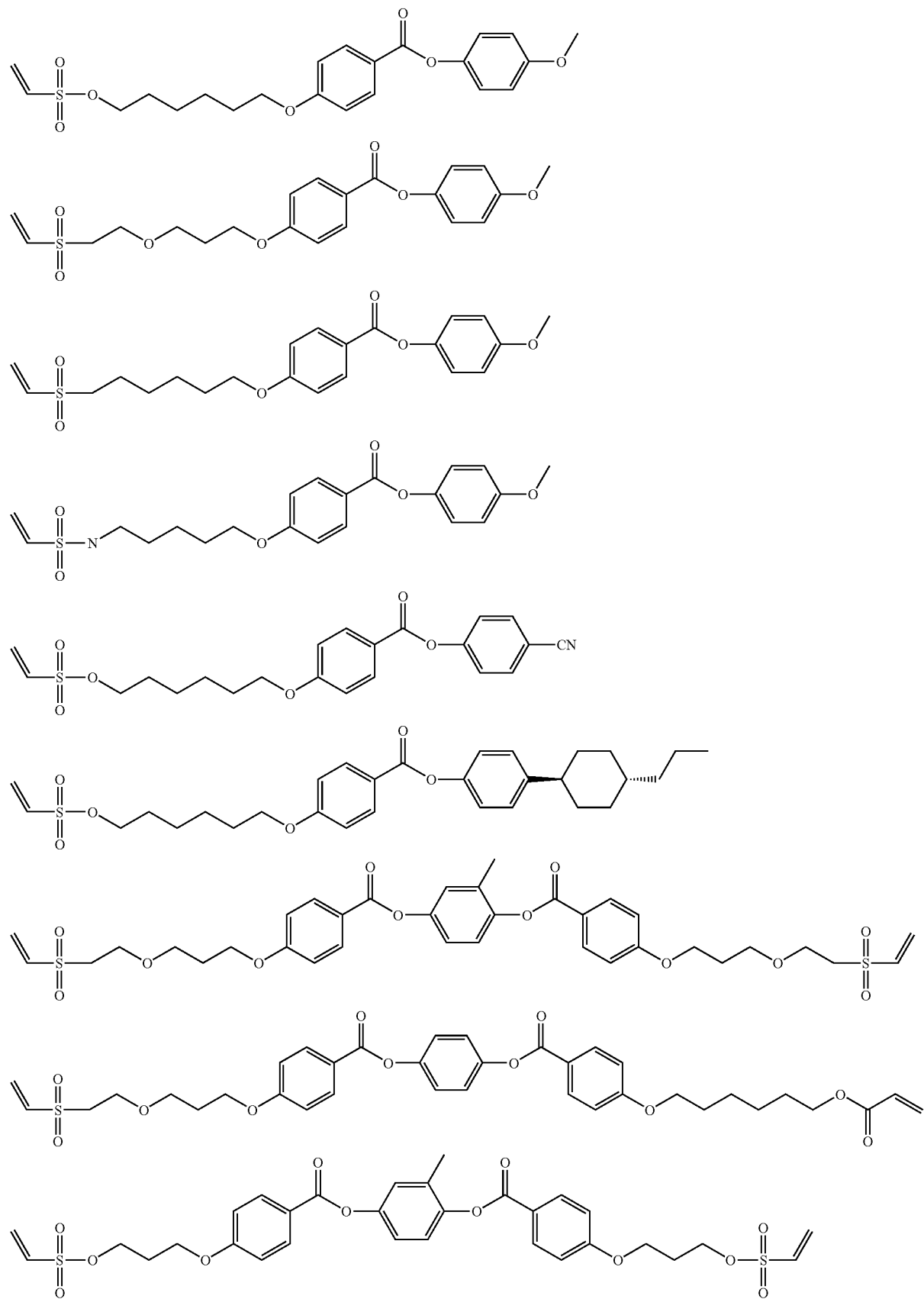

According to the present invention, the vinylsulfone derivative represented by Formula 1 may have stereoisomers, if $A^1$ is alkenylene, or ring B, ring C and/or $E^1$ is cyclohexylene. Herein, the vinylsulfone derivative having stereoisomers is preferably present in a trans-form with liquid crystal characteristics. Additionally, stereoisomers of the vinylsulfone derivative may be present in a ratio of trans-isomer:cis-isomer of 85:15~100:0.

In the case of a compound represented by Formula 10 wherein $R^5$ is —OH, it is possible to obtain a compound having vinylsulfone groups attached to both ends thereof as well as a mono-vinylsulfone derivative represented by Formula 5.

Additionally, the vinylsulfone derivative according to the present invention, represented by the following Formula 6, may be prepared by way of the following Reaction Scheme 2:

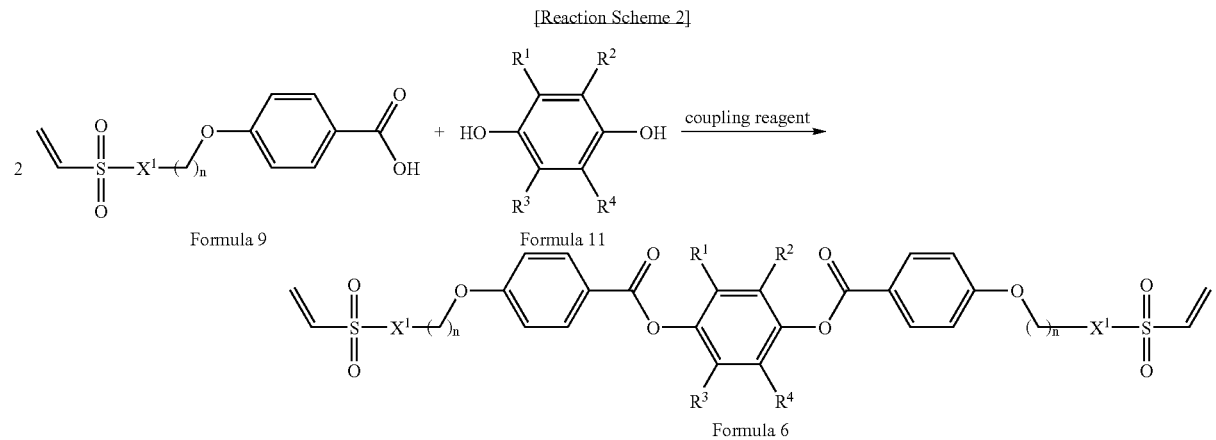

Also, the vinylsulfone derivative represented by Formula 2 may have stereoisomers, if $A^1$ and/or $A^2$ is alkenylene, or ring B, ring C, ring D, $E^1$ and/or $E^2$ is cyclohexylene. Herein, the vinylsulfone derivative having stereoisomers is preferably present in a trans-form with liquid crystal characteristics. Additionally, stereoisomers of the vinylsulfone derivative may be present in a ratio of trans-isomer:cis-isomer of 85:15~100:0.

Hereinafter, methods for preparing the vinylsulfone derivative according to the present invention will be explained in more detail.

The vinylsulfone derivative according to the present invention, represented by the following Formula 5, may be prepared by way of the following Reaction Scheme 1:

wherein $X^1$, $R^1$, $R^2$, $R^3$ and $R^4$ are the same as defined in the above Formula 2, and n is an integer of 1~12.

In Reaction Schemes 1 and 2, there is no particular limitation in the coupling reagent. Non-limiting examples of the coupling reagent include EDC or DCC. Also, the coupling reaction of an acid with an alcohol may be performed by using thionyl chloride or oxalyl chloride in the presence of an alcohol solvent.

Herein, the compound of Formula 9 used in the above Reaction Schemes 1 and 2 may be prepared by way of the following Reaction Scheme 3:

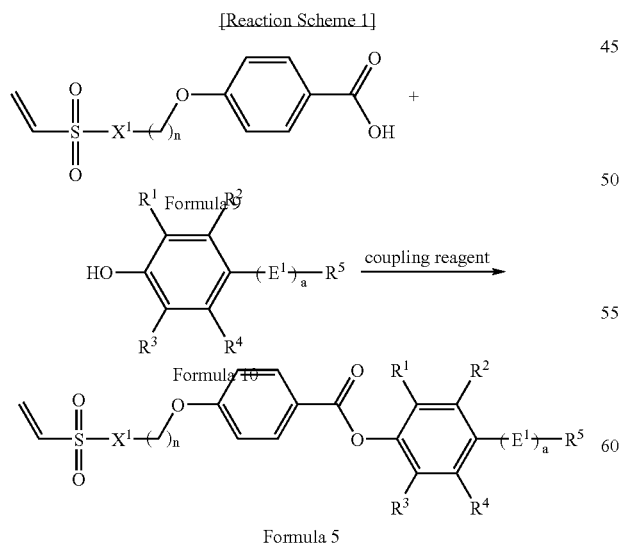

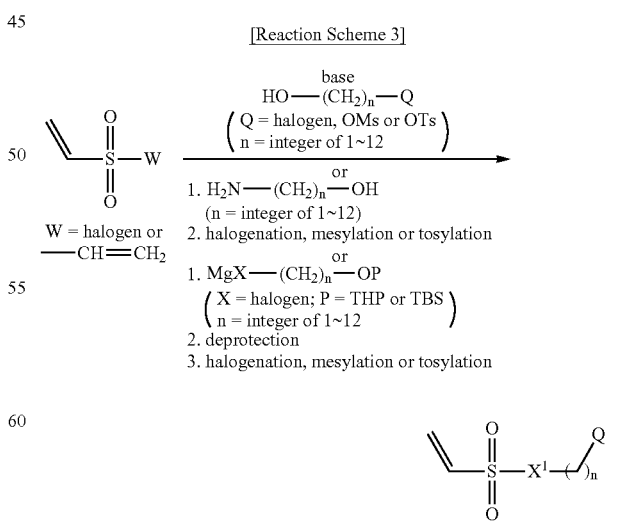

wherein $X^1$, $E^1$, a, $R^1$, $R^2$, $R^3$, $R^4$ and $R^5$ are the same as defined in the above Formula 1, and n is an integer of 1~12.

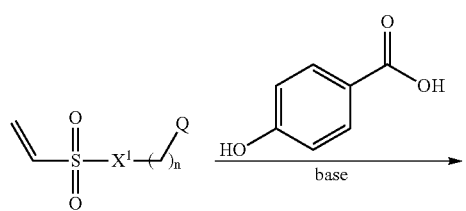

Q = halogen, OMs or OTs

Formula 12

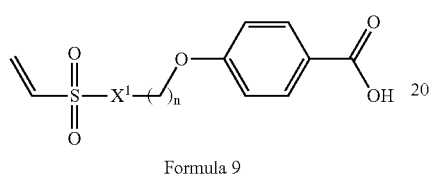

Formula 9 wherein n is an integer of 1~12, and $X^1$ is the same as defined in the above Formula 1.

The linker used in Reaction Scheme 3 may also include alkylene oxides and alkenyl alcohols, besides alkyl alcohols represented by the formula of HO—$(CH_2)_n$-Q, and vinylsulfone derivatives obtained by using such alkylene oxides and alkenyl alcohols are also included in the scope of the present invention. Additionally, there is no particular limitation in the base used in Reaction Scheme 3, and conventional base compounds known to those skilled in the art may be used.

Further, the vinylsulfone derivative according to the present invention, represented by the following Formula 14, may be prepared by way of the following Reaction Scheme 4:

[Reaction Scheme 4]

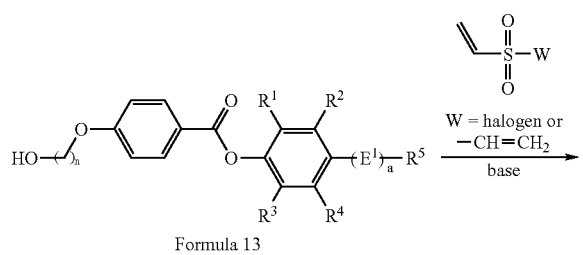

Formula 13

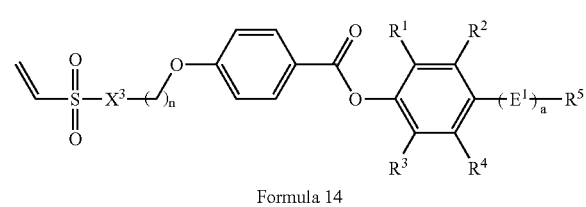

Formula 14 wherein $E^1$, a, $R^1$, $R^2$, $R^3$, $R^4$ and $R^5$ are the same as defined in the above Formula 1, n is an integer of 1~12, and $X^3$ is —O— or —$CH_2CH_2O$—.

Herein, the compound represented by Formula 13 may be prepared by way of the following Reaction Scheme 5:

[Reaction Scheme 5]

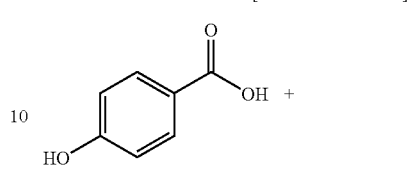

+

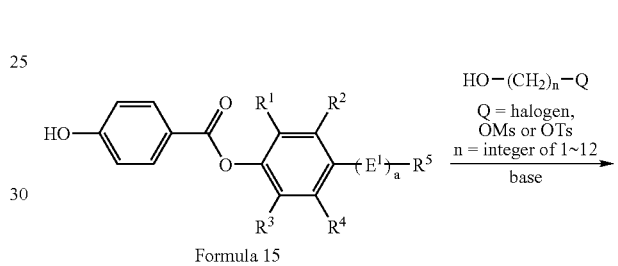

Formula 10

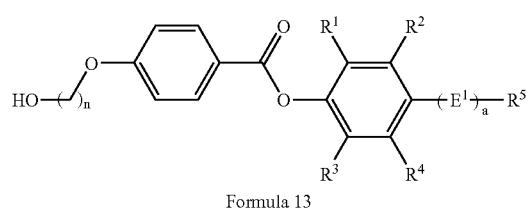

Formula 15

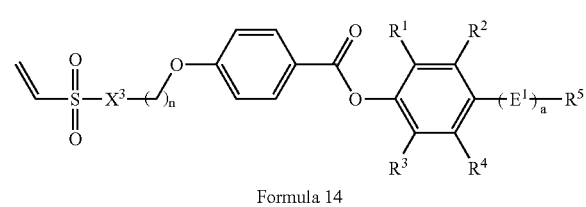

Formula 13 wherein $E^1$, a, $R^1$, $R^2$, $R^3$, $R^4$ and $R^5$ are the same as defined in the above Formula 1, and n is an integer of 1~12.

In Reaction Scheme 5, the compound represented by Formula 15 may be prepared from 4-hydroxybenzoic acid and the compound represented by Formula 10 via Dean-Stark reaction, or in the presence of thionyl chloride or oxalyl chloride, but is not limited thereto. The linker used to prepare the compound of Formula 13 from the compound of Formula 15 may also include alkylene oxides and alkenyl alcohols, besides alkyl alcohols represented by the formula of HO—$(CH_2)_n$-Q, and vinylsulfone derivatives obtained by using such alkylene oxides and alkenyl alcohols are also included in the scope of the present invention. Additionally, there is no particular limitation in the base used in Reaction Schemes 4 and 5, and conventional base compounds known to those skilled in the art may be used.

Further, the vinylsulfone derivative according to the present invention, represented by the following Formula 17, may be prepared by way of the following Reaction Scheme 6:

[Reaction Scheme 6]

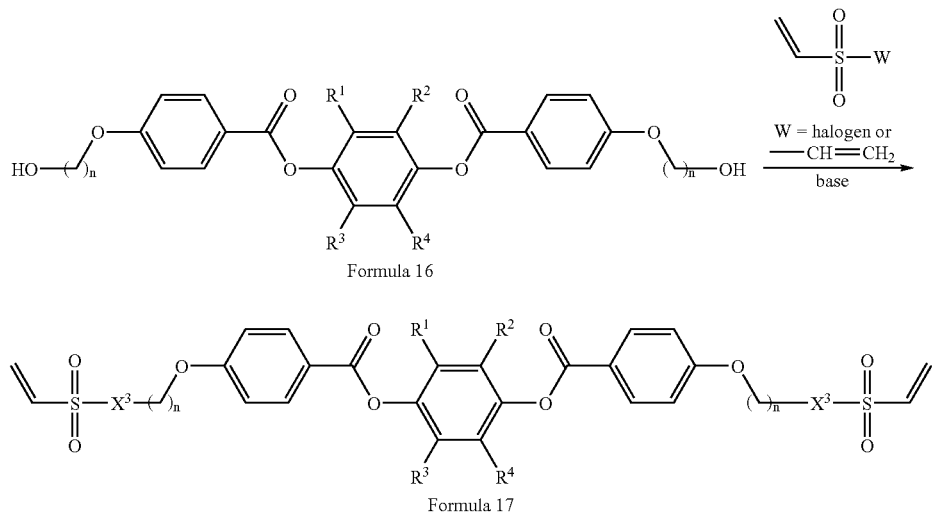

wherein $R^1$, $R^2$, $R^3$ and $R^4$ are the same as defined in the above Formula 2, n is an integer of 1~12, and $X^3$ is —O— or —$CH_2CH_2O$—.

Herein, the compound of Formula 16 may be prepared by way of the following Reaction Scheme 7:

compound represented by Formula 15 in Reaction Scheme 5, but is not limited thereto. Additionally, there is no particular limitation in the base used in Reaction Schemes 6 and 7, and conventional base compounds known to those skilled in the art may be used.

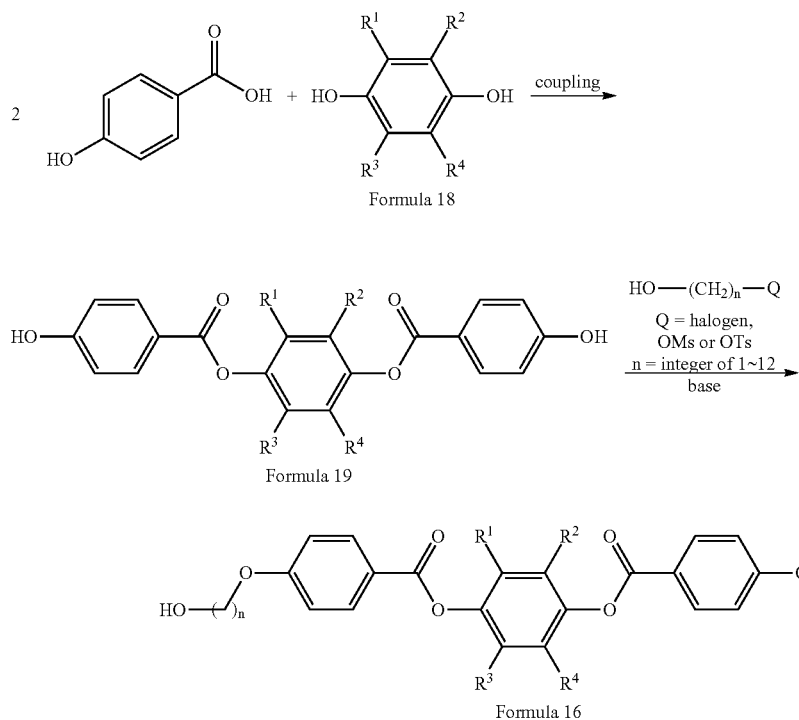

wherein $R^1$, $R^2$, $R^3$ and $R^4$ are the same as defined in the above Formula 2, and n is an integer of 1~12.

In Reaction Scheme 7, the compound of Formula 19 may be prepared in the same manner as the preparation of the Further, the vinylsulfone derivative according to the present invention, represented by the following Formula 22, may be prepared by way of the following Reaction Scheme 8:

[Reaction Scheme 8]

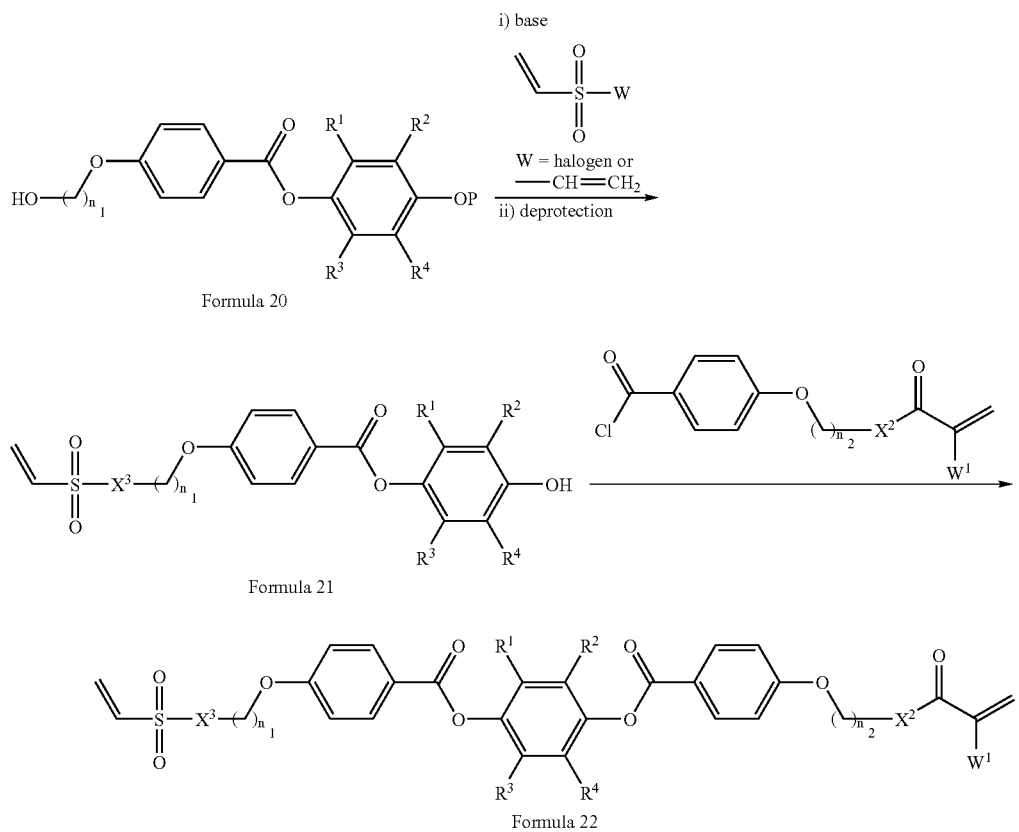

wherein $W^1$, $X^2$, $R^1$, $R^2$, $R^3$ and $R^4$ are the same as defined in the above Formula 2, each of $n_1$ and $n_2$ independently represents an integer of 1~2, and $X^3$ is —O— or —CH$_2$CH$_2$O—.

Herein, the compound of Formula 20 may be prepared by way of the following Reaction Scheme 9:

[Reaction Scheme 9]

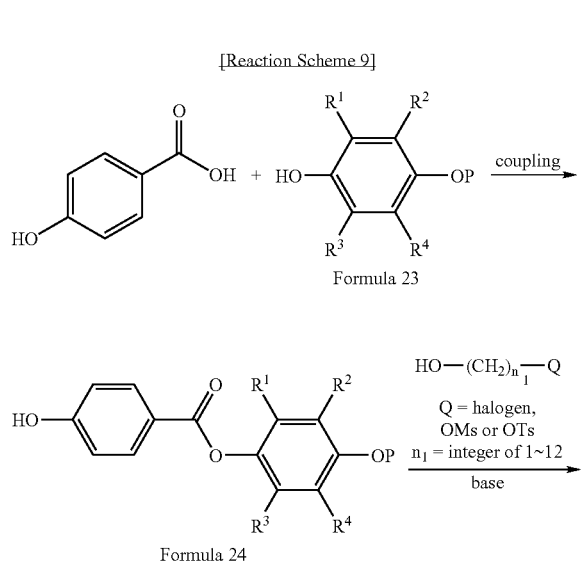

-continued

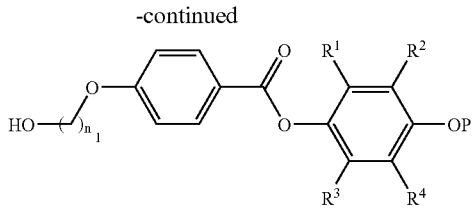

wherein $R^1$, $R^2$, $R^3$ and $R^4$ are the same as defined in the above Formula 1, and $n_1$ is an integer of 1~12. Additionally, in the compounds represented by Formula 20, Formula 23 and Formula 24, P represents a protecting group generally known to those skilled in the art, and non-limiting examples of the protecting group include THP, TBS, or the like.

In Reaction Scheme 9, the compound of Formula 24 may be prepared in the same manner as the preparation of the compound represented by Formula 15 in Reaction Scheme 5, but is not limited thereto. Additionally, there is no particular limitation in the base used in Reaction Schemes 8 and 9, and conventional base compounds known to those skilled in the art may be used.

Further, the vinylsulfone derivative according to the present invention, represented by the following Formula 25, may be prepared by way of the following Reaction Scheme 10:

[Reaction Scheme 10]

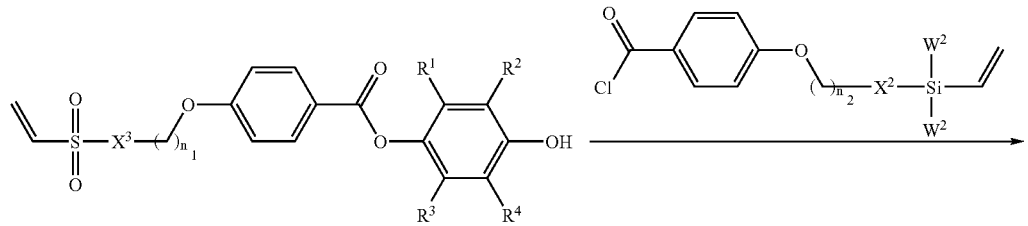

wherein $W^2$, $X^2$, $R^1$, $R^2$, $R^3$ and $R^4$ are the same as defined in the above Formula 2, each of $n_1$ and $n_2$ is an integer of 1~12, and $X^3$ is —O— or —$CH_2CH_2O$—.

Methods for preparing the vinylsulfone derivatives according to the present invention also include other methods performed via a reaction path similar to Reaction Schemes 1~10.

The vinylsulfone derivative obtained as described above is well mixed with various liquid crystal materials. Also, the vinylsulfone derivative is physically and chemically stable and is stable against heat and light, under the application conditions of conventional liquid crystal display devices, and forms a liquid crystal mesophase at a preferred range of temperatures.

Accordingly, the present invention also provides a liquid crystal composition comprising at least one vinylsulfone derivative selected from the group consisting of the vinylsulfone derivatives represented by Formula 1 and Formula 2.

Each vinylsulfone derivative is used in the liquid crystal composition in an amount of 0.1~99.9 wt %, preferably of 1~180 wt, based on the total weight of the composition.

The liquid crystal composition according to the present invention may further comprise other liquid crystal compounds currently used in the conventional liquid crystal composition in addition to the above vinylsulfone derivative. Such compounds may be used at various ratios as desired.

Additionally, the liquid crystal composition according to the present invention may further comprise suitable additives, if necessary. Non-limiting examples of such additives include a chiral dopant or a leveling agent that inhibits a spiral structure of liquid crystal or reverse distortion of liquid crystal.

The liquid crystal composition according to the present invention may be prepared in a conventional manner. Typically, various components for forming the liquid crystal composition are dissolved at room temperature or high temperature.

Further, the present invention provides a compensation film for liquid crystal display device, which comprises the vinylsulfone derivative or the liquid crystal composition according to the present invention.

Particular examples of the compensation film for liquid crystal display device include A-plate type compensation films, B-plate type compensation films, (+)C-plate type compensation films, (−)C-plate type compensation films, or the like.

Reference will now be made in detail to the preferred embodiments of the present invention. However, the following examples are illustrative only, and the scope of the present invention is not limited thereto.

EXAMPLE 1

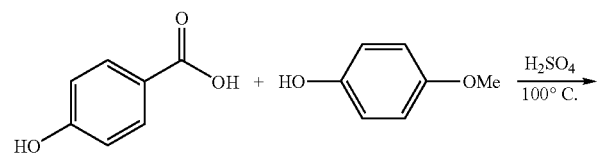

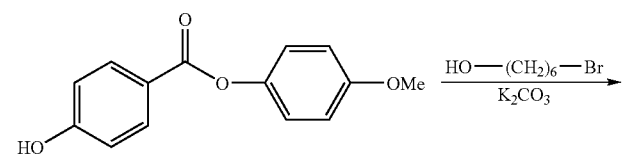

-continued

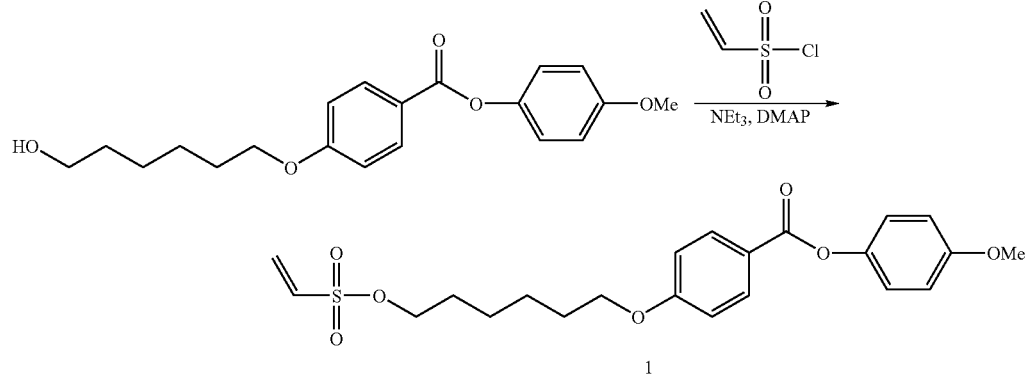

1

First, 4-hydroxybenzoic acid and 4-methoxyphenol were heated at 100° C. for 10 hours in benzene as a solvent at a mole ratio of 1:1 with a small amount of sulfuric acid added thereto, while removing water. After the completion of the reaction, the organic layer was dissolved in ether and washed with water several times to remove sulfuric acid used to perform the reaction. Next, the organic solvent was dewatered with anhydrous magnesium sulfate, and the resultant product was subjected to distillation under reduced pressure to obtain a yellow solid, which, in turn, was washed with ether several times to obtain a white ester compound at a yield of about 85%.

added thereto at low temperature. The reaction mixture was allowed to react at low temperature for about 1 hour and the reaction product was worked up with water. Then, the resultant product was subjected to chromatography using silica gel to obtain the final vinylsulfone derivative (1) at a yield of 75%. $^1$HNMR (400 MHz, CDCl$_3$): δ 1.47~1.57 (m, 4H), 1.78~1.88 (m, 4H), 3.83 (s, 3H), 4.05 (t, 2H), 4.16 (t, 2H), 6.13 (d, 1H), 6.36 (d, 1H), 6.55 (dd, 1H), 6.91~6.98 (m, 4H), 7.15 (d, 2H), 8.14 (d, 2H).

EXAMPLE 2

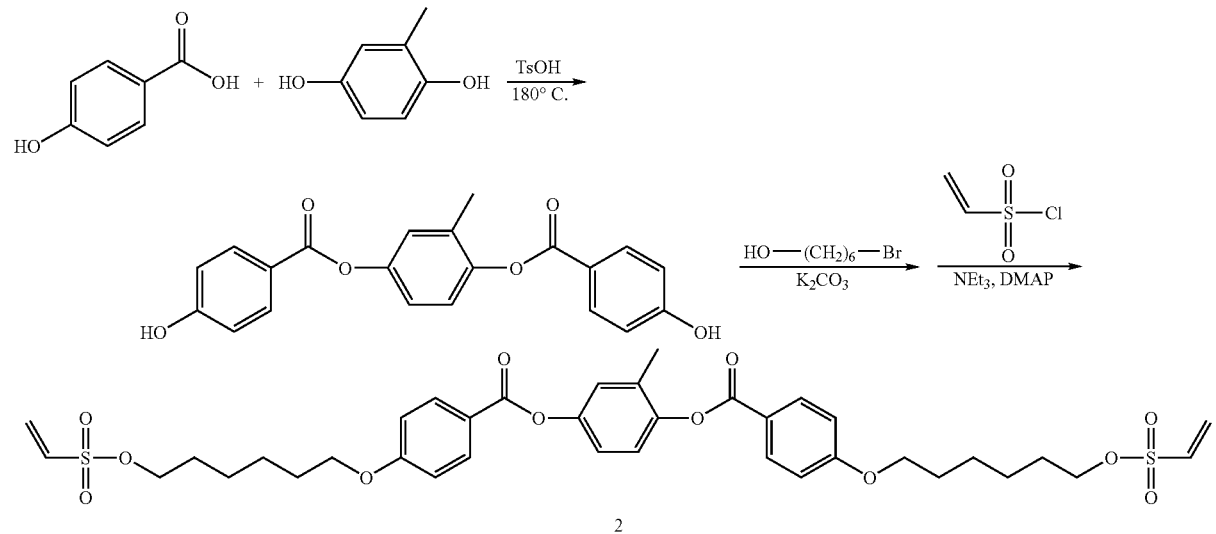

2

The above ester compound was dissolved in butanone as a solvent, 1.2 equivalents of K$_2$CO$_3$ and 1.1 equivalents of 6-bromo-1-hexanol were added thereto, and the reaction mixture was stirred thoroughly at about 80° C. for about 20 hours. Next, the salt formed from the reaction was removed by using ether and water, and the reaction product was subjected to distillation under reduced pressure to obtain a solid organic compound, which, in turn, was washed with hexane several times to obtain an alcohol compound as a white solid at a yield of 92%.

The above alcohol compound and 1.2 equivalents of chlorovinyl-sulfone were dissolved into CH$_2$Cl$_2$ as a solvent, and 1.1 equivalents of TEA and 0.2 equivalents of DMAP were First, 4-hydroxybenzoic acid and 2-methylhydroquinone were heated at 180° C. for about 4 hours in diethylbenzene as a solvent at a mole ratio of 2:1 with a small amount of TsOH added thereto, while removing water. After the completion of the reaction, the reaction mixture was filtered to obtain a crude solid compound, which, in turn, was washed with water and with ether several times to obtain an ester compound as a white solid at a yield of 85%.

The above diester compound was dissolved in butanone as a solvent, 2.4 equivalents of K$_2$CO$_3$ and 2.2 equivalents of 6-bromo-1-hexanol were added thereto, and the reaction mixture was stirred thoroughly at about 80° C. for about 20 hours. The salt formed from the reaction was removed by using ether and water and the reaction mixture was subjected to distillation under reduced pressure to obtain an organic compound as a solid, which, in turn, was washed with hexane several times to obtain a di-alcohol compound as a white solid at a yield of 80%.

The above di-alcohol compound and 2.2 equivalents of chlorovinyl-sulfone were dissolved in $CH_2Cl_2$ as a solvent, and 2.2 equivalents of TEA and 0.2 equivalents of DMAP were added thereto at low temperature. The reaction mixture was allowed to react at low temperature for about 1 hour, and then worked up with water. Then, the reaction mixture was subjected to column chromatography using silica gel to obtain the final vinylsulfone derivative (2) at a yield of 65%. $^1$HNMR (400 MHz, $CDC_3$): δ 1.44~1.59 (m, 8H), 1.70~1.80 (m, 8H), 2.25 (s, 3H), 4.05 (t, 4H), 4.15 (t, 4H), 6.12 (d, 2H), 6.40 (d, 2H), 6.55 (dd, 2H), 6.95~7.00 (m, 4H), 7.06 (dd, 1H), 7.12 (d, 1H), 7.19 (d, 1H), 8.14~8.18 (m, 4H).

EXAMPLE 3

The ester compound, obtained from 4-hydroxybenzoic acid and 4-methoxyphenol at a mole ratio of 1:1, was dissolved in butanone as a solvent, 1.2 equivalents of $K_2CO_3$ and 1.1 equivalents of 3-bromo-1-propanol were added thereto, and the reaction mixture was stirred thoroughly at about 80° C. for about 10 hours. The salt formed from the reaction was removed by using ether and water, and the reaction mixture was subjected to distillation under reduced pressure to obtain an organic compound as a solid, which, in turn, was washed with hexane several times to obtain a white solid at a yield of 95%.

The white solid compound and 1.2 equivalents of divinyl-sulfone were dissolved in $CH_2Cl_2$ as a solvent, 1.1 equivalents of DBU were added thereto, and the reaction mixture was allowed to react for about 40 hours. Then, the reaction mixture was subjected to column chromatography using silica gel to obtain the final vinylsulfone derivative (3) at a yield of 81%. $^1$HNMR (400 MHz, $CDC_3$): δ 2.04~2.21 (m, 2H), 3.26 (t, 2H), 3.69 (t, 2H), 3.83 (s, 3H), 3.90 (t, 2H), 4.15 (t, 2H), 6.03 (d, 1H), 6.39 (d, 1H), 6.69 (dd, 1H), 6.91~6.98 (m, 4H), 7.13 (d, 2H), 8.14 (d, 2H).

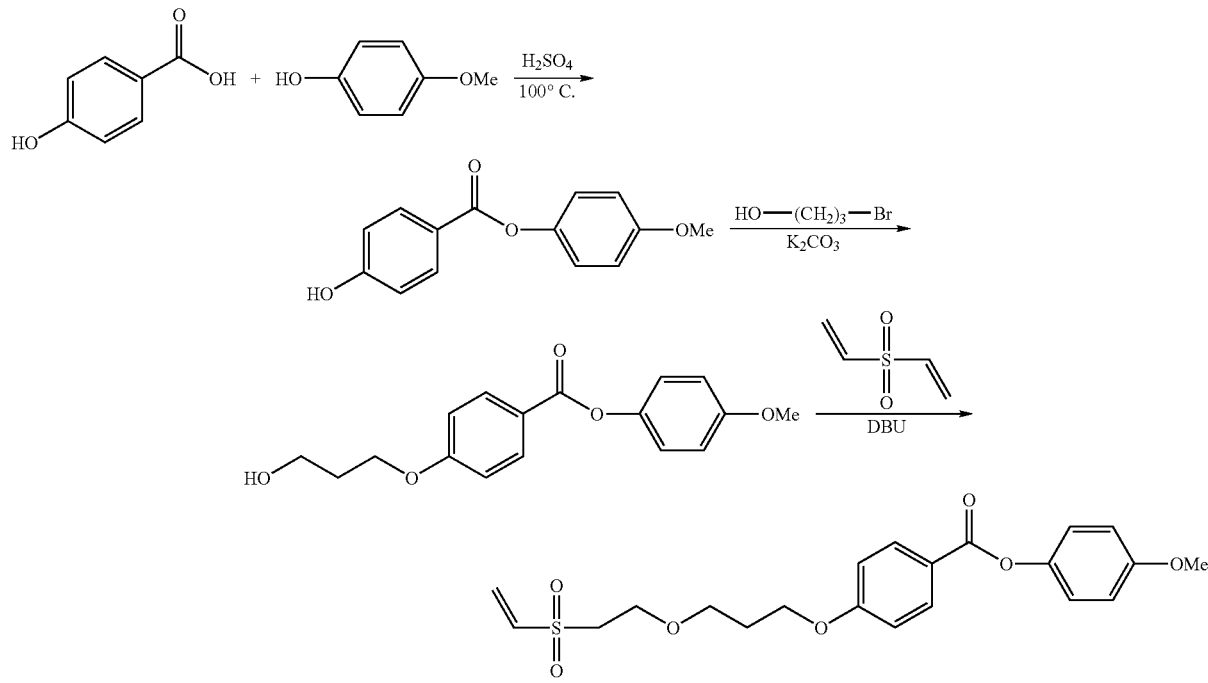

EXAMPLE 4

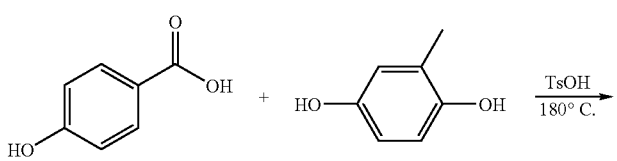

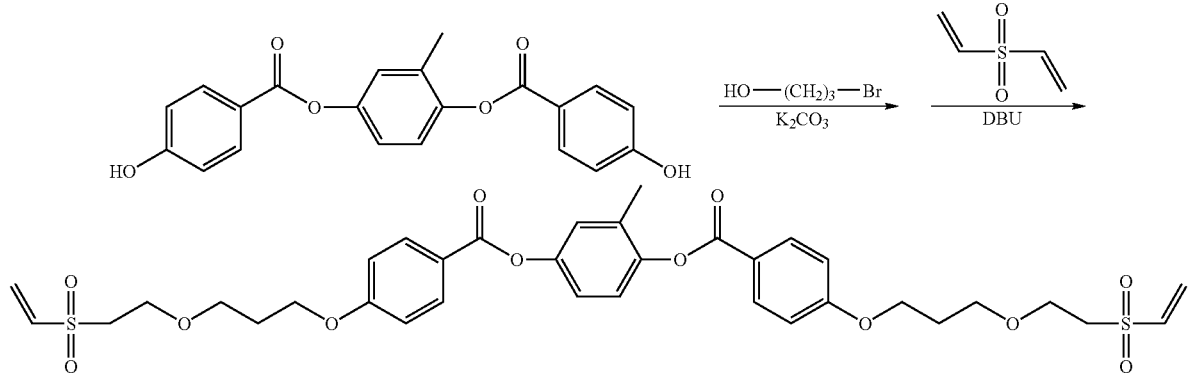

4

First, 4-hydroxybenzoic acid and 2-methylhydroquinone were heated at about 180° C. for about 4 hours in diethylbenzene as a solvent at a mole ratio of 2:1 with a small amount of TsOH added thereto, while removing water. After the completion of the reaction, the reaction mixture was filtered to obtain a crude compound, which, in turn, was washed with water and with ether several times to obtain an ester compound as a white solid at a yield of 85%.

Next, 1.0 equivalent of the above diester compound and 2.2 equivalents of 3-bromo-1-propanol were dissolved in butanone as a solvent, 2.2 equivalents of $K_2CO_3$ was added thereto, and the reaction mixture was stirred thoroughly at 80° C. for about 10 hours. The reaction mixture was worked up with ether and water, and subjected to distillation under reduced pressure to remove the organic solvent. The solid compound obtained from the preceding step was washed with hexane to obtain a white di-alcohol compound at a yield of 90%.

Then, 1.0 equivalent of the above di-alcohol compound was dissolved in $CH_2Cl_2$ as a solvent, and 2.2 equivalents of divinyl-sulfone and the equivalent amount of DBU were added thereto. The reaction mixture was allowed to react at room temperature for about 40 hours. After that, the reaction mixture was subjected to column chromatography using silica gel to obtain the final compound (4) as a pale yellow solid at a yield of 70%. $^1$HNMR (400 MHz, CDCl$_3$): δ 2.09~2.22 (m, 4H), 2.24 (s, 3H), 3.27 (t, 4H), 3.71 (t, 4H), 3.92 (t, 4H), 4.15 (t, 2H), 6.05 (d, 2H), 6.39 (d, 2H), 6.70 (dd, 2H), 6.97~7.01 (m, 4H), 7.06 (dd, 1H), 7.13 (d, 1H), 7.19 (d, 1H), 8.14~8.18 (m, 4H).

EXAMPLE 5

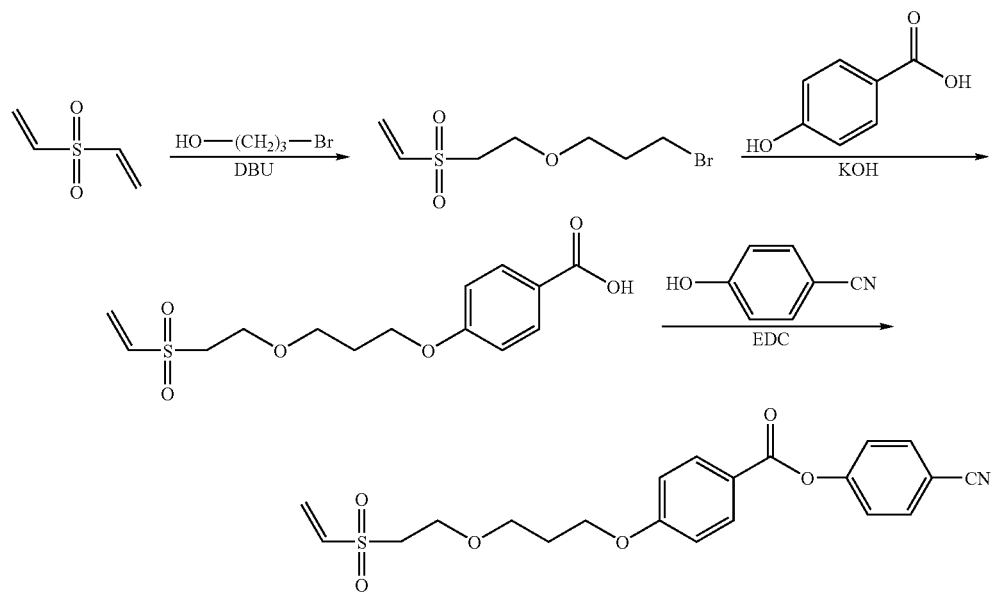

5

First, 1.2 equivalents of divinylsulfone and 3-bromo-1-propanol were dissolved in $CH_2Cl_2$, 1.1 equivalents of DBU was added thereto, and the reaction mixture was allowed to react at room temperature for about 20 hours. Next, the reaction mixture was separated by using silica gel.

Then, 1 equivalent of the compound and 1 equivalent of 4-hydroxybenzoic acid were added to a mixed solvent containing THF:H₂O (1:1), 1.1 equivalents of KOH was added thereto, and the reaction mixture was heated for about 10 hours. The solid obtained from the reaction was filtered off, and washed with water and ether to obtain an acid as a pale yellow solid at a yield of 75%.

After that, 1.0 equivalent of the above acid compound, 1.0 equivalent of 4-cyanophenol and 1.2 equivalents of EDC were dissolved in CH₂Cl₂, and the reaction mixture was allowed to react at room temperature for about 10 hours. After the completion of the reaction, the reaction mixture was separated by using silica gel to obtain the final vinylsulfone derivative (5) at a yield of 85%. ¹HNMR (400 MHz, CDCl₃): δ 2.05~2.19 (m, 2H), 3.25 (t, 2H), 3.68 (t, 2H), 3.91 (t, 2H), 4.18 (t, 2H), 6.05 (d, 1H), 6.38 (d, 1H), 6.68 (dd, 1H), 6.99 (d, 2H), 7.33 (d, 2H), 7.75 (d, 2H), 8.13 (d, 2H).

EXAMPLE 6

The final vinylsulfone derivative (6) was obtained at a yield of 78% by using EDC in the same manner as described in Example 5. ¹HNMR (400 MHz, CDCl₃) δ 0.91 (t, 3H), 0.94~1.11 (m, 2H), 1.18~1.47 (m, 6H), 1.84~1.88 (m, 4H), 2.04~2.19 (m, 2H), 2.41 (t, 1H), 3.25 (t, 2H), 3.69 (t, 2H), 3.90 (t, 2H), 4.15 (t, 2H), 6.03 (d, 1H), 6.40 (d, 1H), 6.69 (dd, 1H), 6.96 (d, 2H), 7.11 (d, 2H), 7.25 (d, 2H), 8.14 (d, 2H).

EXAMPLE 7

Liquid Crystal Composition 1

Liquid Crystal Composition 1 was prepared by using the following components:

-continued
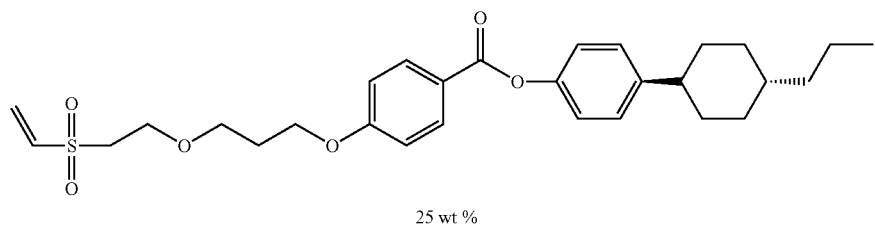
25 wt %
EXAMPLE 8
Liquid Crystal Composition 2
Liquid Crystal Composition 2 was prepared by using the following components:
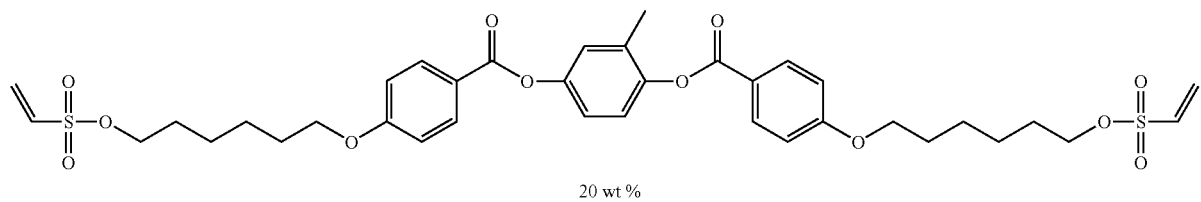
20 wt %
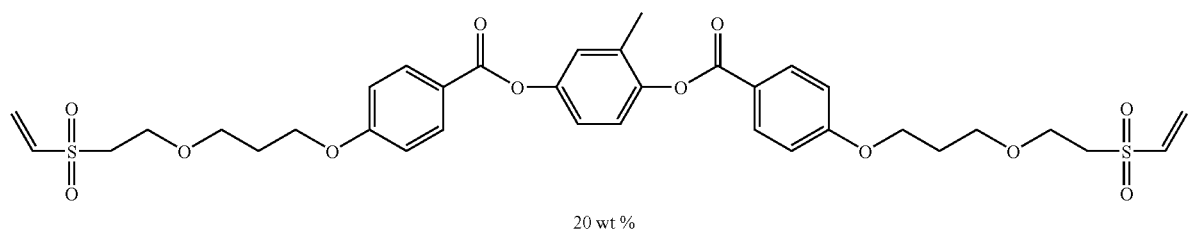
20 wt %
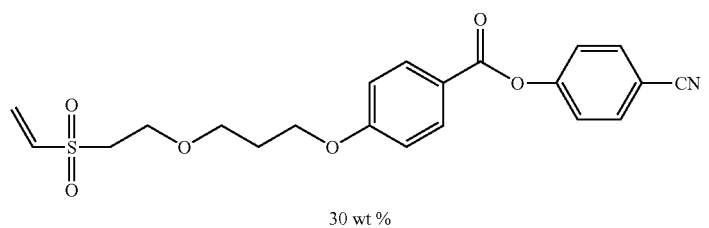
30 wt %
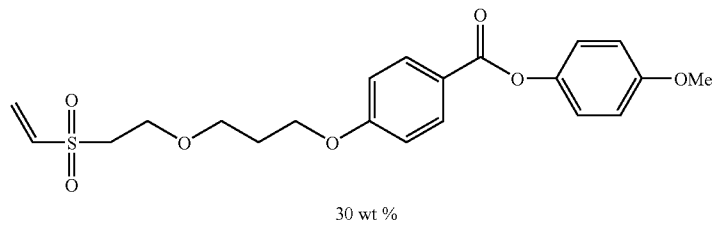
30 wt %

EXAMPLE 9

Liquid Crystal Composition 3

Liquid Crystal Composition 3 was prepared by using the following components:

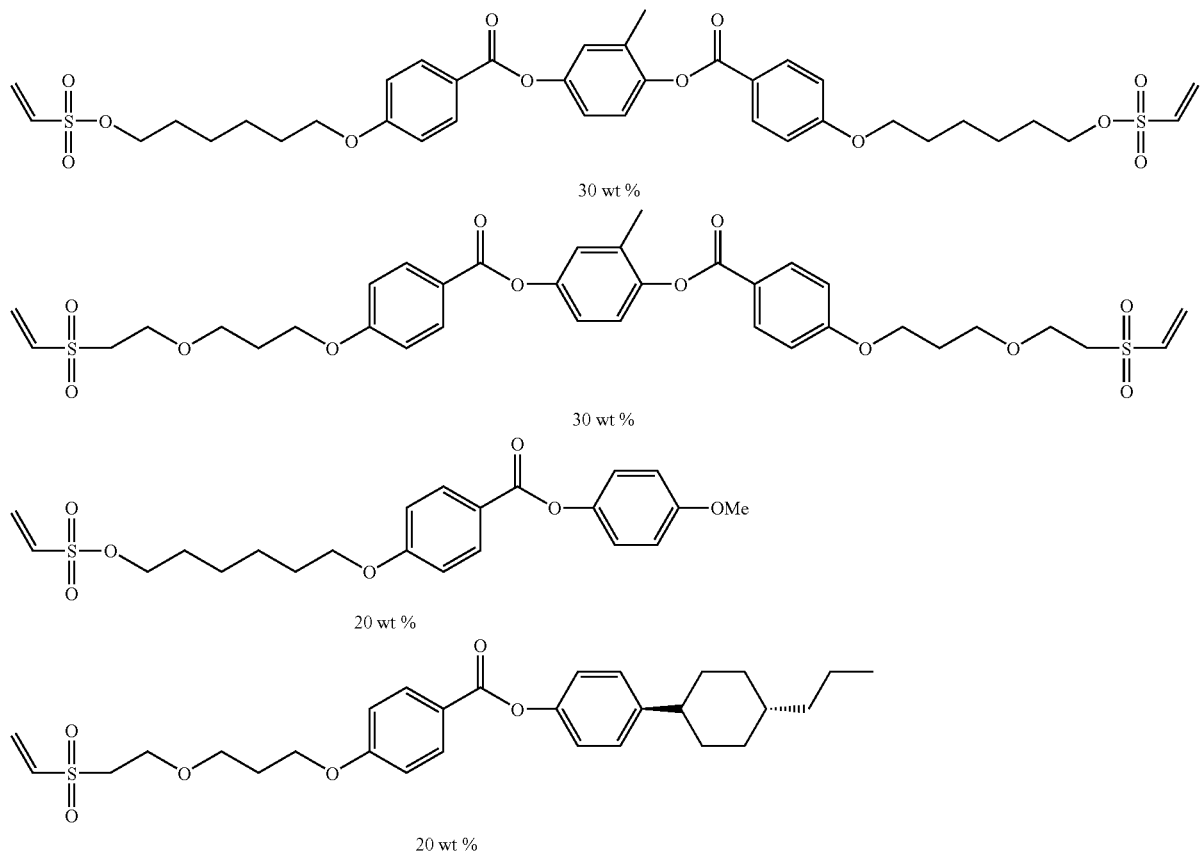

30 wt %

30 wt %

20 wt %

20 wt %

EXAMPLE 10

Manufacture of +C Type Compensation Film

First, 9.289 of the liquid crystal composition 1 according to Example 7 was dissolved in 15 g of toluene and 15 g of xylene. Then, 600 mg of Irgacure 907, 40 mg of FC-4430 and 80 mg of BYK-300 were added thereto and the reaction mixture was shaken sufficiently. After completely dissolving the materials, particles were removed by using a particle filter. The resultant solution was bar-coated onto an oriented COP (cycloolefin polymer) having a thickness of 80 μm and treated with an aligning layer by using a wire bar. The coated product was dried in an oven at 50° C. for 1 minute, and UV rays (200~80 W/m) were irradiated thereto to provide a +C type compensation film.

EXAMPLE 11

Manufacture of +C Type Compensation Film

A +C type compensation film was manufactured in the same manner as described in Example 10, except that Liquid Crystal Composition 2 according to Example 8 was used instead of Liquid Crystal Composition 1 according to Example 7.

EXAMPLE 12

Manufacture of +C Type Compensation Film

A +C type compensation film was manufactured in the same manner as described in Example 10, except that Liquid Crystal Composition 3 according to Example 9 was used instead of Liquid Crystal Composition 1 according to Example 7.

COMPARATIVE EXAMPLE 1

Manufacture of +C Type Compensation Film

A +C type compensation film was manufactured in the same manner as described in Example 10, except that Merck RM257 was used instead of Liquid Crystal Composition 1 according to Example 7. After drying the coating layer, a dewetting phenomenon occurred. Also, a white turbid non-uniform film was formed after curing.

[Determination of Physical Properties of Compensation Films]

Each of the +C type compensation films according to Examples 10~12 was determined for its thickness and refraction index.

More particularly, the film coatability was evaluated by using a polarizing microscope and the film thickness was measured by using a micro-gauge. Also, the birefringence index was measured at an wavelength of 550 nm by using an Abbe refractometer. The results are shown in the following Table 1.

TABLE 1

| Compensation Film | Thickness (um) | In-plane refraction index ($n_{xy}$) | Out-of-plane refraction index ($n_z$) | Birefringence index ($\Delta n$) |
| --- | --- | --- | --- | --- |
| Ex. 10 | 1 | 1.492 | 1.621 | 0.129 |
| Ex. 11 | 1 | 1.481 | 1.623 | 0.142 |
| Ex. 12 | 1 | 1.485 | 1.644 | 0.159 |

As can be seen from Table 1, the compensation films obtained by using the liquid crystal composition comprising the vinylsulfone derivative according to the present invention have excellent film coatability, allow the formation of a transparent film after curing, and show uniform film appearance with a birefringence index ($\Delta n$) of 0.129~0.159.

INDUSTRIAL APPLICABILITY

As can be seen from the foregoing, the novel vinylsulfone derivative according to the present invention and the liquid crystal composition comprising the same have high refractive anisotropy characteristics. Additionally, a high-quality view angle compensation film, which improves a contrast ratio measured at a tilt angle when compared to a contrast ratio measured from the front surface and minimizes color variations in a black state depending on view angles, can be fabricated by using the liquid crystal composition according to the present invention.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

What is claimed is:

1. A vinylsulfone derivative represented by the following Formula 1:

[Formula 1]

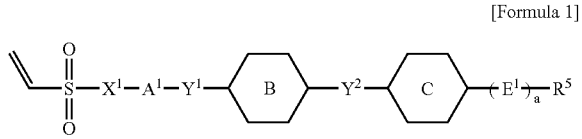

wherein $X^1$ is —O—, —CH$_2$CH$_2$O—, or —(CH$_2$)$_m$—, and m is 1 or 2;
$A^1$ is a $C_1$~$C_{12}$ alkylene, a $C_2$~$C_{12}$ alkenylene, —(CH$_2$CH$_2$O)$_n$—, —(CH$_2$CHCH$_3$O)$_n$— or —(CHCH$_3$CH$_2$O)$_n$—, and n is an integer of 1~5;
each of $Y^1$ and $Y^2$ independently represents a single bond, —C(=O)O—, or —OC(=O)—;

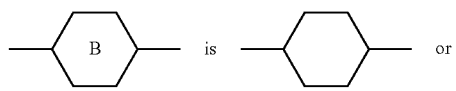

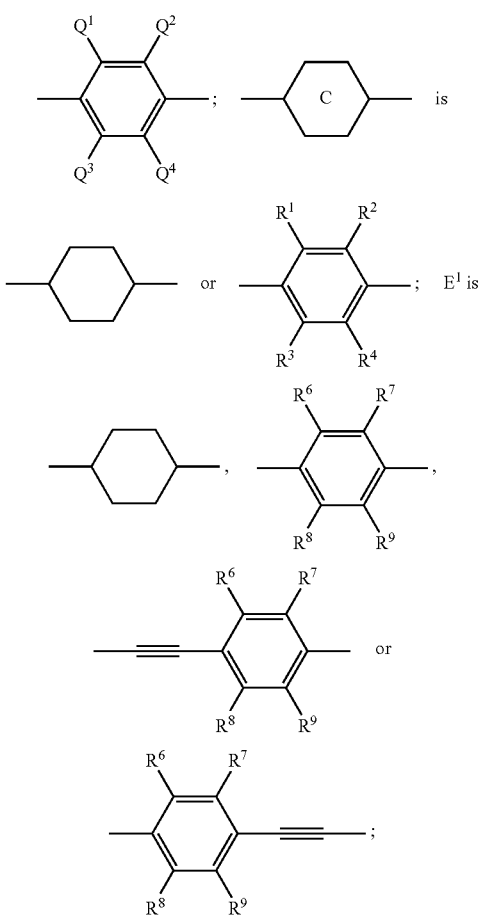

a is an integer of 0~2;
each of $Q^1$~$Q^4$, $R^1$~$R^4$ and $R^6$~$R^9$ independently represents —H, —F, —Cl, —Br, —I, —CN, —OH, —CH$_3$, —CH$_2$CH$_3$ or —C(=O)CH$_3$; and
$R^5$ is —H, —F, —Cl, —Br, —I, —CF$_3$, —CN, —OH, —OCH$_3$, —OCH$_2$CH$_3$, —OCF$_3$, a $C_1$~$C_{12}$ alkyl or a $C_2$~$C_{12}$ alkenyl.

2. The vinylsulfone derivative according to claim 1, wherein the $C_2$~$C_{12}$ alkenylene as $A^1$ is —CH=CH—, —CH=CCH$_3$—, —CH$_2$CH=CH—, —CH=CHCH$_2$CH$_2$—, —CH$_2$CH=CHCH$_2$—, —CH$_2$CH$_2$CH=CH—, —CH=CHCH$_2$CH$_2$CH$_2$—, —CH$_2$CH=CHCH$_2$CH$_2$—, —CH$_2$CH$_2$CH=CHCH$_2$—, or —CH$_2$CH$_2$CH$_2$CH=CH—; and the $C_2$~$C_{12}$ alkenyl as $R^5$ is —CH=CH$_2$, —CH=CHCH$_3$, —CH$_2$CH=CH$_2$, —CH=CHCH$_2$CH$_3$, —CH$_2$CH=CHCH$_3$, —CH$_2$CH$_2$CH=CH$_2$, —CH=CHCH$_2$CH$_2$CH$_3$, —CH$_2$CH=CHCH$_2$CH$_3$, —CH$_2$CH$_2$CH=CHCH$_3$, or —CH$_2$CH$_2$CH$_2$CH=CH$_2$.

3. The vinylsulfone derivative according to claim 1, which has stereoisomers and the stereoisomers are present in a ratio of [trans isomer:cis isomer] of 85:15~100:0.

4. The vinylsulfone derivative according to claim 1, which is prepared by way of the following Reaction Scheme 1:

[Reaction Scheme 1]

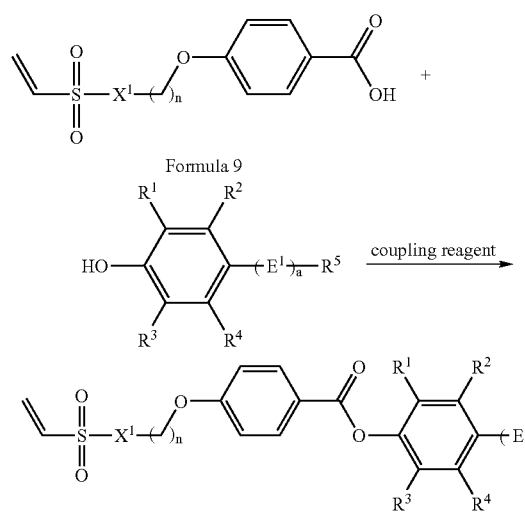

wherein $X^1$, $E^1$, a, $R^1$, $R^2$, $R^3$, $R^4$ and $R^5$ are the same as defined in claim 1, and n is an integer of 1~12.

5. The vinylsulfone derivative according to claim 4, wherein a compound represented by the following Formula 9 is prepared by way of the following Reaction Scheme 3:

[Reaction Scheme 3]

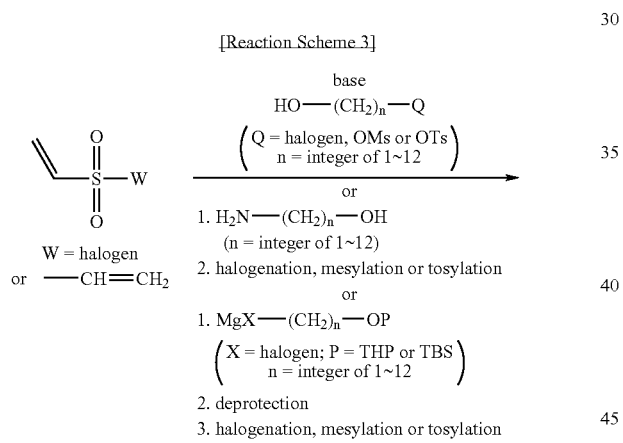

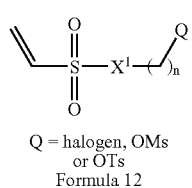

Q = halogen, OMs or OTs
Formula 12

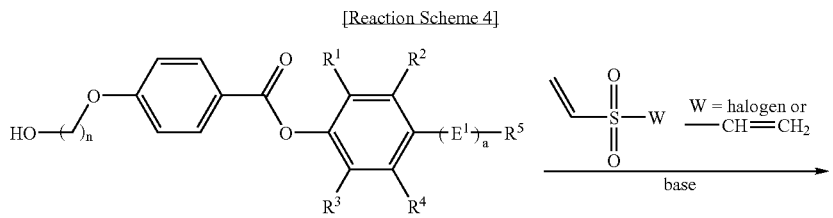

wherein n is an integer of 1~12, and $X^1$ is the same as defined in claim 1.

6. The vinylsulfone derivative according to claim 1, which is prepared by way of the following Reaction Scheme 4:

[Reaction Scheme 4]

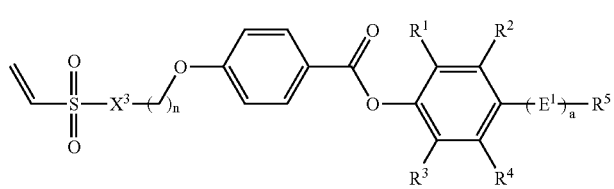

wherein $E^1$, a, $R^1$, $R^2$, $R^3$, $R^4$ and $R^5$ are the same as defined in claim 1, n is an integer of 1~12, and $X^3$ is —O— or —CH$_2$CH$_2$O—.

7. A liquid crystal composition comprising at least one vinylsulfone derivative selected from the group consisting of the vinylsulfone derivative represented by the following Formula 1:

[Formula 1]

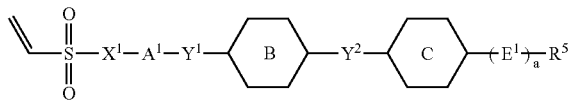

wherein $X^1$, $A^1$, $Y^1$, $Y^2$, ring B, ring C, $E^1$, a and $R^5$ are the same as defined in claim 1.

8. The liquid crystal composition according to claim 7, wherein each vinylsulfone derivative contained in the liquid crystal composition is used in an amount of 1~80 wt % based on the total weight of the composition.

9. A compensation film for liquid crystal display device, which comprises the liquid crystal composition as defined in claim 7.

10. The compensation film for liquid crystal display device according to claim 9, wherein each vinylsulfone derivative contained in the liquid crystal composition is used in an amount of 1~80 wt % based on the total weight of the composition.

11. The compensation film for liquid crystal display device according to claim 9, which is an A-plate type compensation film, a B-plate type compensation film, a (+)C-plate type compensation film, or a (−)C-plate type compensation film.

* * * * *